Patented July 23, 1935

2,008,955

UNITED STATES PATENT OFFICE 2,008,955

PROCESS FOR REDUCING THE WATER CONTENT OF LIQUIDS

William A. Hammond, Yellow Springs, Ohio

No Drawing. Application April 30, 1931,
Serial No. 534,149

3 Claims. (Cl. 202—68)

This invention relates to a process for reducing the water content of organic or other liquids in which calcium sulphate is substantially insoluble and has for its primary object to provide a process whereby organic liquids may be dried rapidly and efficiently.

The process consists in bringing the liquid to be dried or treated at any suitable temperature between its freezing and boiling points, or the vapor of the liquid at a suitable temperature above its boiling point, into intimate contact with powdered or granular anhydrous calcium sulphate which has been prepared by lightly burning calcium sulphate dihydrate or the half-hydrate until practically completely dehydrated, so as to render it highly porous and give it a strong affinity for water or water vapor, as described in my copending application entitled "Drying agent and process of manufacturing same", filed April 30, 1931, Serial No. 534,148.

Anhydrous calcium sulphate, when of a highly porous nature resultant from proper heat treatment, has been found to possess a high chemical affinity for water, whether in the liquid or vapor form, over a wide range of temperature. The avidity with which this particular form of anhydrous calcium sulphate combines with water, either liquid or vapor, makes it a drying or desiccating agent of the highest efficiency. Thus, when the powdered or granular anhydrous calcium sulphate is brought into contact with water, a rise in temperature is noted and analysis shows the solid to consist either of the half-hydrate or the dihydrate, depending on the proportion of water present. The reaction takes place instantly upon contact of the solid with water, up to an amount sufficient to form the half-hydrate therewith, regardless of whether the water is in the form of liquid or vapor, alone or mixed in large or small proportions throughout the body of another liquid or vapor. Thus, when the drying agent is added in powdered or granular form to, for instance, 95% ethyl alcohol, a rise in temperature is noted, and upon distillation or filtration the alcohol is found to be entirely or nearly dry or water-free.

In applying the drying agent to the drying of non-aqueous or organic liquids the factor of temperature is taken into consideration and the process varied to adapt it to the drying of liquids having vapor pressures and boiling points varying over a wide range.

The drying agent in absorbing water first reverts to the half-hydrate. This half-hydrate will, on being heated, lose water. The temperature at which the half-hydrate begins to lose water is not sharply defined and depends on such factors as the vapor with which it is in contact, time of heating, etc. It may be said that the half-hydrate begins to lose water at varying rates at temperatures near 100° C. and the rate or amount of this dehydration increases with further increases of temperature or exposures to such temperatures for long periods of time. In applying the invention it is important after a liquid is dried by contact with the solid, that the dried liquid be separated from the solid at such temperatures and under such conditions as will not dehydrate, or expel water from, the half-hydrate formed in the drying process.

In applying the invention I prefer to divide the non-aqueous or organic liquids into two general classes or groups depending on their boiling points, these classes not being sharply defined:

(A) Liquids having boiling points below 100° C.

(B) Liquids having boiling points above 100° C.

The variations of the process covered by the invention may be described as follows:

(A) For the drying of liquids having boiling points below 100° C., two procedures are available and equally effective:

(1) I place either the powdered or granular drying agent in a regular distilling apparatus, retort or other suitable vessel fitted with means for heating, devices for indicating temperatures and a delivery pipe or tube running to a condenser. The liquid to be dried is then added to the solid in the apparatus. (The proportion of solid to liquid may be readily calculated from an estimation of the water content of the liquid and the fact that the solid has a water absorbing capacity up to 6.6 per cent of its own weight, to form the half-hydrate.) Any suitable means may be employed for bringing all the solid into contact with the liquid. The liquid readily soaks into the pores of the solid, and the extraction of the water by the solid is indicated by the sudden rise in temperature. Theoretically, no time need be lost in waiting for the extraction of the water by the solid. However, there may be some advantage in allowing the solid and liquid to stand in contact to allow the dispersed molecules or particles of water, by process of diffusion or molecular motion, to come into contact with the anhydrous calcium sulphate. The apparatus containing the mixed solid and liquid is then connected with a dry condenser and distillation carried out in the usual way. The distillate should be dry or nearly dry. If the condenser and receptacle are not perfectly dry, the first fraction of the distillate may be withdrawn and run back into the distilling apparatus or retort for further drying.

(2) The second procedure for drying liquids having boiling points below 100° C. takes advantage of the fact that anhydrous calcium sulphate prepared as described extracts or absorbs water vapor from other gases or vapors. In using this procedure, I place the liquid to be dried in a distilling vessel or retort heated by any suitable means and fitted with a thermometer. The delivery pipe or tube of the distilling retort connects with any suitable chamber or system of coiled pipes which contain the drying agent in the form of granules of suitable size. This system of pipes or coiled tubes is immersed in a water or other bath or other device for maintaining uniform temperature and the same heated to a temperature slightly above the boiling point of the liquid to be dried. These drying pipes, tubes, or columns should preferably be long tubes of glass, enamelled ware or metal (depending on the nature of the liquid), and should be connected to a condenser. Therefore, when the liquid in the distilling retort is boiled its vapor is forced from the delivery tube through the drying tube in contact with the drying agent in which the water is removed and on through the condenser into the receiving vessel. To facilitate the movement of the vapor through the whole system, the distilling vessel may be fitted with a pipe or tube through which dry air or other gas may be passed slowly through the system. This slow passage of dry air or other gas serves to hasten the process of distillation and to remove practically all vapor of the liquid being dried rapidly from the drying tube or column. Such an assembly may obviously be constructed of any suitable material and in any size, depending on the liquid to be dried and the capacity desired.

(B) For the drying of liquids having boiling points above 100° C., two procedures are also available and equally effective:

(1) The drying operation is carried out at room or any normal temperature below 100° C. by adding the powdered or mixed powdered and finely granular drying agent in required proportions to the liquid in any suitable vessel. The mixed solid and liquid are agitated by any suitable means to insure intimate contact. The mixture may be allowed to stand for a period of time, though for the more limpid or fluid liquids this is not necessary. On mixing the solid and liquid a sudden rise in temperature may be noted, indicating the water-extraction reaction is in progress. The mixture is then passed through a suitable filter with due precaution to protect the dried liquid from moist apparatus or moist air. The filtered liquid is found to be dry or practically dry. Owing to the extreme insolubility of calcium sulphate in non-aqueous or organic liquids the dried liquid contains only the faintest trace of dissolved calcium sulphate.

(2) Liquids which normally (that is, at atmospheric pressure) boil at temperatures above 100° C. may be distilled at temperatures much below 100° C. by the usual process of vacuum distillation. Such a liquid, therefore, as normal butyl alcohol, whose normal boiling point is approximately 117° C. may be dried by the method "A—1" described above, simply by connecting the system with a suitable device for maintaining the system under a pressure below that of the atmosphere, or 760 millimeters of mercury.

As stated above, this classification of liquids is not sharply defined. Any of the above variations of the process covered by the invention may readily be adapted to the drying of a particular liquid, and the variation selected by one skilled in the art may well depend on the liquid to be dried, the degree of drying required, and the general conditions under which the operations are to be carried out.

In the appended claims, the term "lightly burned" is used to distinguish anhydrous calcium sulphate produced by heating the hydrated salt at a temperature less than 300° C., as described in the aforementioned co-pending application, from the known "dead" burned calcium sulphate resulting from burning the hydrate at a higher temperature.

As pointed out above, the avidity with which light burned anhydrous calcium sulphate removes water from fluid in contact therewith continues unabated until the sulphate is completely transformed to the half-hydrate form, which indicates that, from the time some water is added to the anhydrous material until the half-hydration is complete, the sulphate is a mixture of the anhydrous and half-hydrate forms, and that it is the remaining anhydrous portion of the material that unites with the water. In the following claims, where drying by anhydrous calcium sulphate is specified, reference is had to the drying performed by this anhydrous portion of the sulphate, although it is mixed with the half-hydrate.

What I claim is:

1. The process of rendering substantially anhydrous material which, at the beginning of the process, contains some water, and which is of the class consisting of organic liquids and their vapors which do not chemically react with calcium sulphate and in which calcium sulphate is substantially insoluble, which consists in bringing said material into contact with lightly burned substantially anhydrous calcium sulphate, and thereafter separating the dried material from said calcium sulphate.

2. The process of removing water from an organic liquid which, at the beginning of the process, contains some water, has an affinity for said water of the order of that of ethyl alcohol, and does not chemically react with calcium sulphate and in which calcium sulphate is substantially insoluble which consists in bringing the water-bearing liquid into contact with lightly burned anhydrous calcium sulphate having a greater affinity for water than does ethyl alcohol and separating the dried liquid from the calcium sulphate.

3. The process of removing water from organic liquids which, at the beginning of the process, contain some water and do not chemically react with calcium sulphate and in which calcium sulphate is substantially insoluble which consists in boiling the liquid to be dried, passing the vapor through a body of lightly burned granular anhydrous calcium sulphate of a highly porous nature maintained at a temperature slightly above the boiling point of the liquid, and condensing the vapor after it has passed said body.

WILLIAM A. HAMMOND.